US007203557B1

(12) United States Patent
Thompson

(10) Patent No.: US 7,203,557 B1
(45) Date of Patent: Apr. 10, 2007

(54) AUDIO SIGNAL DELAY APPARATUS AND METHOD

(75) Inventor: Laurence A. Thompson, Saratoga, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 0 days.

(21) Appl. No.: 09/478,122

(22) Filed: Jan. 5, 2000

(51) Int. Cl.
*G06F 17/00* (2006.01)

(52) U.S. Cl. ........................................................ 700/94

(58) Field of Classification Search .................. 381/97; 700/94; 348/512, 515, 423.1, 462; 704/500–502; 713/401; 352/19, 12–13; 375/240.26, 240.28
See application file for complete search history.

(56) References Cited

U.S. PATENT DOCUMENTS 6,119,091 A * 9/2000 Huang et al. ............... 704/500
6,205,223 B1 * 3/2001 Rao ............................ 380/42
6,233,562 B1 * 5/2001 Sueyoshi et al. ........... 704/503
6,272,153 B1 * 8/2001 Huang et al. ............... 370/503
6,449,519 B1 * 9/2002 Kuwaoka ..................... 700/94
2002/0009144 A1 * 1/2002 Ishihara et al. ........ 375/240.16

* cited by examiner

*Primary Examiner*—Vivian Chin
*Assistant Examiner*—Lun-See Lao
(74) *Attorney, Agent, or Firm*—Perkins Coie LLP

(57) ABSTRACT

An apparatus for delaying an audio signal in conformance with the format of the audio signal. An input device is receptive to an audio signal having one of a plurality of formats. A processing device coupled to the input device is operable to provide a delay in the audio signal corresponding to the format of the audio signal. The delayed audio signal is output through an output device. An audio format detection circuit is operable to detect the number of edge transitions within a known period in a processed audio signal and thereby determine the format of the audio signal by comparing a detected edge transition count to model data representative of the plurality of formats.

19 Claims, 6 Drawing Sheets

AUDIO SIGNAL DELAY APPARATUS AND METHOD

FIELD OF THE INVENTION

The present disclosure relates to video and audio circuits and more particularly to circuits that provide a delay in an audio signal and further to circuits that synchronize audio signals with video signals.

BACKGROUND OF THE INVENTION

Household video technology began decades ago with an analog station-transmitted video signal, a roof top antenna, and a three channel black and white television set in a living room. Since then, video technology has experienced rapid growth due to advances in microprocessor, communications, and digital signal processing technology. In addition to the standard television, the video market has expanded to include video cassette recorders (VCR), multiple providers of satellite television, digital cable, video on-demand cable, digital television, hi-definition television, overhead projection television, home movie theaters, camcorder video units and many other video options. As technology continues to develop, the list of video options available to the consumer will continue to grow as well.

The vast video market has led to an expansion of video formats currently in use by these different products. In fact, some products have more than one video format. For example, digital television transmission has been approved and is in operation in the United States. The standard for digital television includes 18 new video formats.

The increasing number of video products and corresponding video formats has created a problem of compatibility between products. In order to experience video from one format in another format, the video stream must be processed and transformed into the desired format. For example, to view video formatted according to the interlaced scanning scheme used in analog television standards on a computer display that uses progressive scanning, a format transformation must be performed.

Before this transformation occurs, a video signal and it's corresponding audio signal are synchronized to temporally correspond to each other. As a result of the format transformation, the required signal processing introduces an undesirable delay in the video stream, causing the video and audio streams to be unsynchronized. That is, as a result of the transformation, conversations and sound effects in the video may not match a speaker's mouth or events as they occur. Furthermore, as signals are processed through more than one device, this delay becomes greater and more noticeable to the viewer. The transformation processing therefore requires that the video and audio signal be re-synchronized to eliminate the undesirable mismatching of the video and audio signals.

A delay introduced in the audio signal provided to synchronize the audio and video signal is dependent upon the format of the video and corresponding audio signal. As discussed above, a number of formats are used for digital video signals. These formats accommodate variable audio sampling rates and sample sizes. Furthermore, digital audio signals are commonly transported from one processing device to another within an audio/video processing product using a number of serial transmission schemes. These schemes use various methods to mark the start of a sample or determine left from right in a stereo pair. One example of such a serial audio stream is a standard known as $I^2S$. As such, different types of digital audio signals require a different delay in order to be properly re-synchronized to their corresponding processed video signal.

Circuits that adjust an audio signal to account for the delay required by video signal processing are well known in the art. However, past solutions of the prior art consist of circuits that provide a delay in the audio signal only for video transformed from one specific format to another. In order to provide the appropriate audio delay for different video format transformations using the solutions in the prior art, several circuits are required as shown in FIG. 1. This solution requires additional hardware and adds expense to the consumer. Furthermore, in many practical cases, the processing device which converts the video formats may have no information regarding which audio format is in use, thus providing an improper delay or otherwise impairing the synchronization process.

What is needed is an apparatus that can determine the digital serial audio format in use, and then automatically delay the serial digital audio stream to synchronize the audio and video streams.

SUMMARY OF THE INVENTION

A disclosed embodiment solves the problem of providing a delay in a digital serial audio signal corresponding to the particular format of audio signal while minimizing the required hardware. The disclosed embodiment determines the audio sample size and sample rate by comparing the frequency of the serial audio clock to a known reference frequency. It also uses the serial clock to sample the serial audio data signals. It then stores the stream of data in a memory which is configured as a circular buffer having a write pointer and a read pointer. The address space between the pointers corresponds to a particular time delay in the data, for example, as the differences in the address increases, so does the delay in reading the data relative to when it was written. The serial audio clock is then used again to output the serial audio data signals such that a delay in the serial digital audio data stream is achieved.

DETAILED DESCRIPTION

Figure 1:
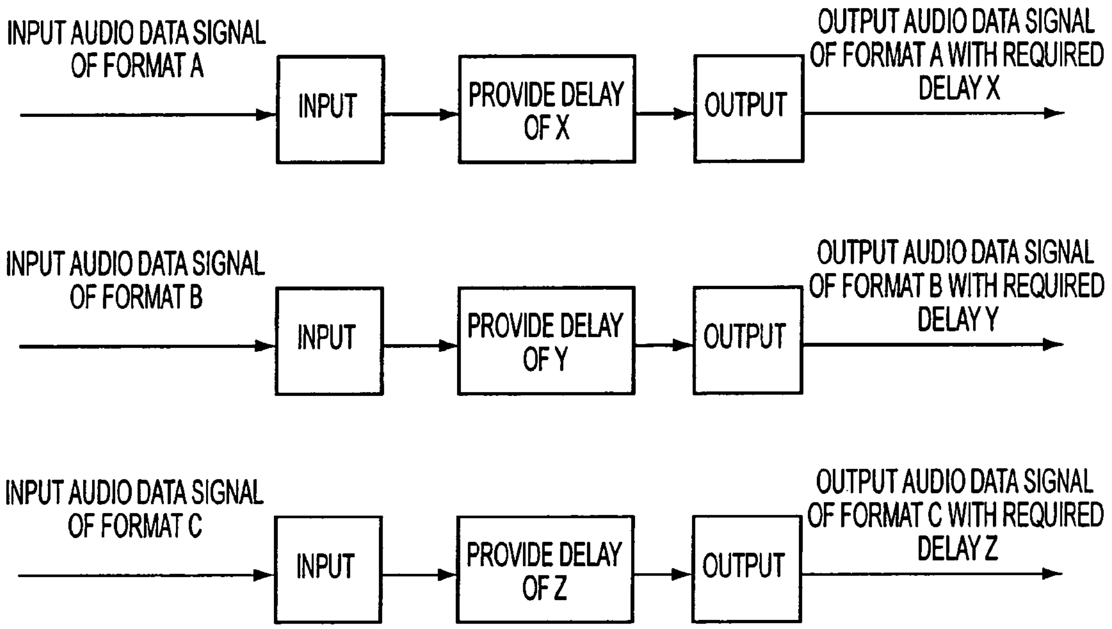
FIG. 1 PRIOR ART
FIG. 1 is a block diagram of the prior art providing a delay for multiple formats of digital audio signals.
Figure 2:
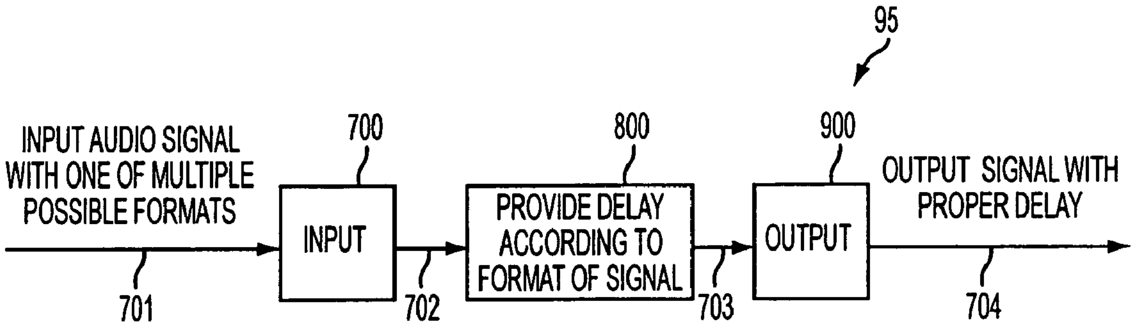
FIG. 2 is a block diagram of the audio delay apparatus.

As shown in FIG. 2, AN audio delay circuit generally designated 95 includes an input device 700, a processing device 800, and an output device 900. The input device 700 is receptive to an incoming audio signal 701. As is known in the art the audio signal may be composed of numerous separate component signals. In the present embodiment, the audio signal includes a serial data signal, a frame synchronization signal, and a clock signal. The frame synchronization signal may have many formats and variations and is referred to by different names depending upon the product provider. This disclosure uses the term "frame synchronization signal" as a broad term meant to include signals such as left and right stereo signals, single pulse signals, data packet start signals, and any other signal that marks the beginning of a packet of data in the audio signal. As is known in the art there are many terms used to label this type of signal and they are all incorporated as the term frame synchronization signal is used in the present disclosure.

Figure 3:
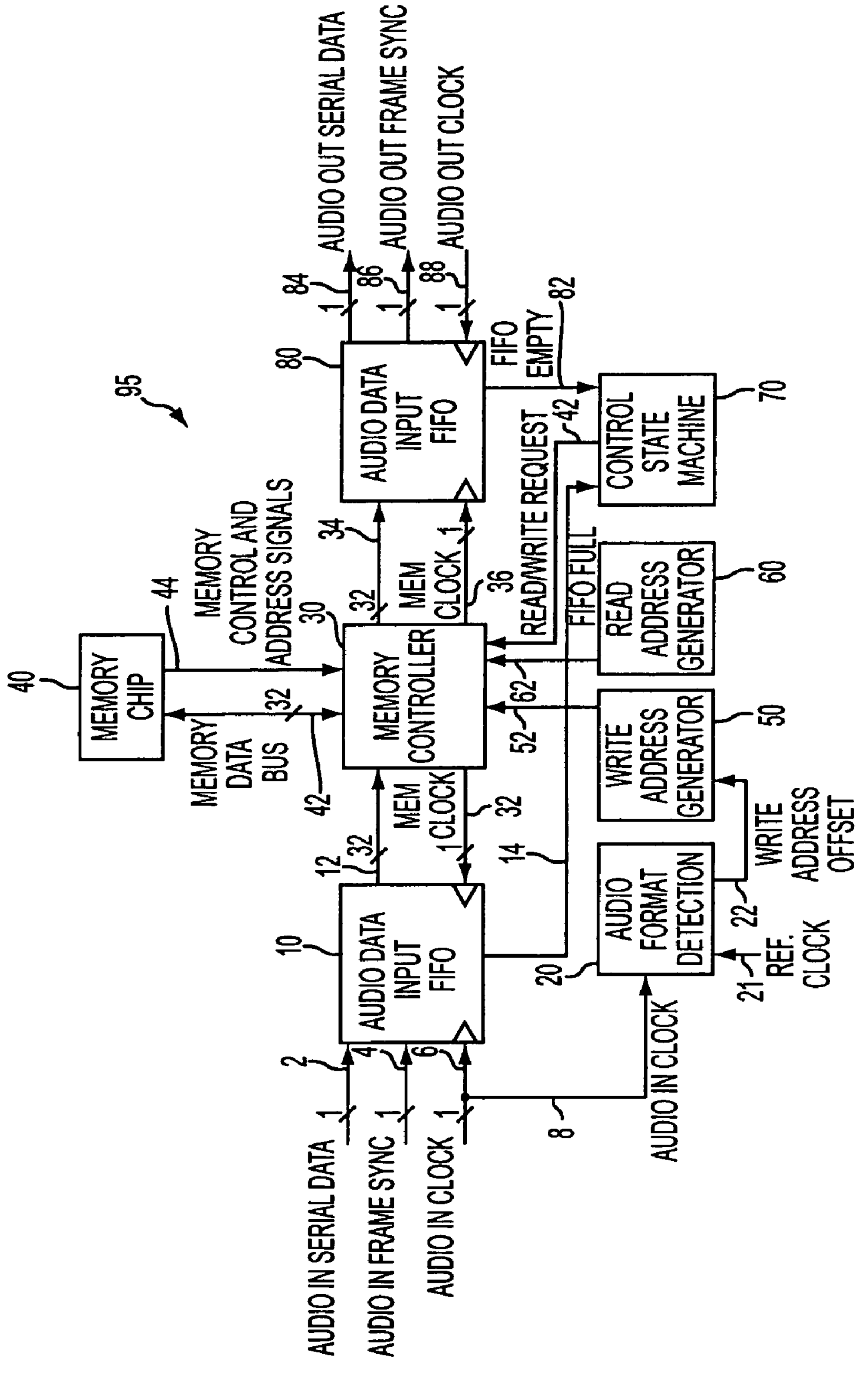
FIG. 3 is a block diagram of the audio delay circuit.

As shown in FIG. 3, the audio delay circuit 95 further includes a FIFO register 10, an audio format detection circuit 20, a memory controller circuit 30, a memory chip 40, a write address generator 50, a read address generator 60, a control state machine 70, and an audio data input FIFO 80.

Figure 4:
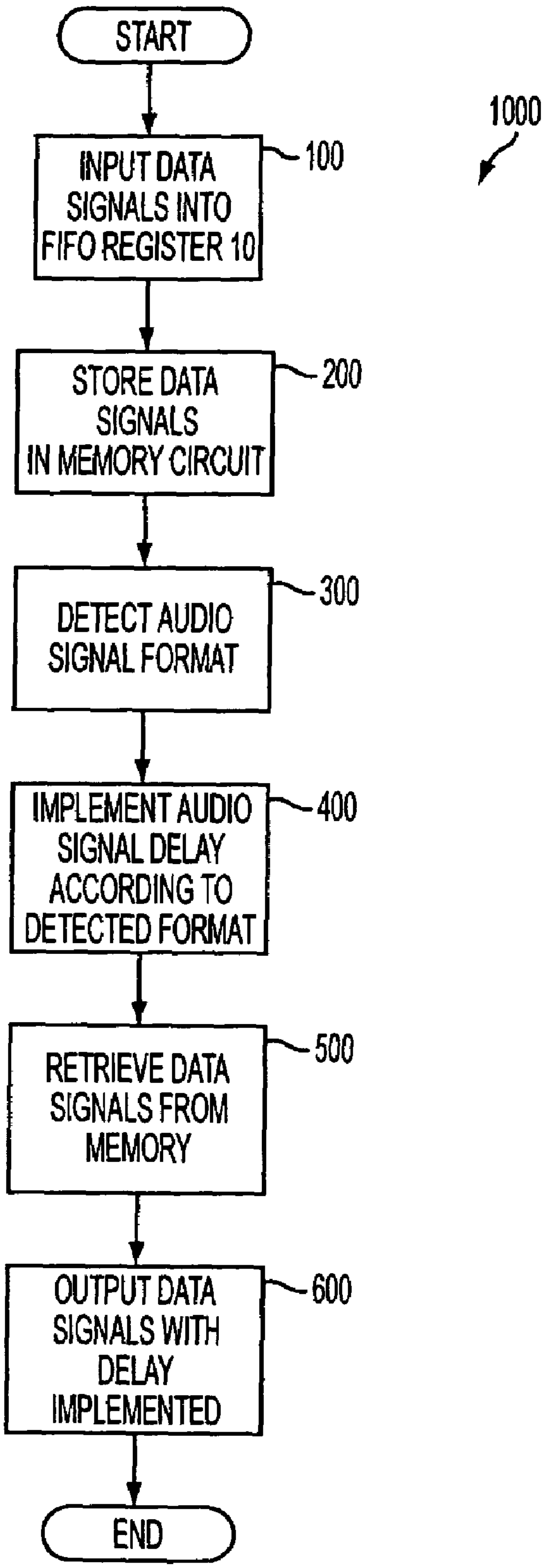
FIG. 4 is a flow chart of the operation of the audio delay circuit.

With the reference of FIG. 4, the circuit flow generally designated 1000 generally includes an operation 100 in which data signals are input into the FIFO register 10, an operation 200 in which data signals are stored in a memory circuit, an operation 300 in which the audio signal format is detected, an operation 400 in which the audio signal delay is implemented according to the audio signal's detected format, an operation 500 in which the data signals are retrieved from memory, and an operation 600 in which the data signals are output with the proper delay implemented.

The operation of the audio delay circuit 95 as shown in FIG. 3 will now be described. Circuit operation begins with the Audio Data Input FIFO 10 receiving the data signal clock and accompanying data signals. In a preferred embodiment, the data signals received are a serial data signal through data line 2, a frame synchronization signal through data line 4, and an audio clock signal through data line 6. Packets of data or frames from the data signals accompanying the audio clock signal are loaded into the FIFO register 10. The size of FIFO register 10 is determined by the requirements of the memory system and the highest data flow rate to be accommodated and is generally unrelated to any specific digital serial audio format. The FIFO register 10 performs serial to parallel conversion of the digital serial audio data and provides temporary storage of the data until a memory write cycle is requested. When FIFO register 10 is full, the FIFO register 10 sends a FIFO full signal to the control state machine 70 through FIFO full data line 14.

Upon receiving the FIFO full signal, the control state machine 70 sends a write request to the memory controller 30 through read/write request data line 72. Upon receiving this request, the memory controller 30 puts the request in a queue (not shown) and when other memory transactions are complete, the memory controller 30 sends a signal to the input FIFO register 10 which causes the FIFO register 10 to drive its contents into the memory data bus 42 and into memory chip 40 under control of the memory controller 30 using control and address signals 44.

Figure 5:
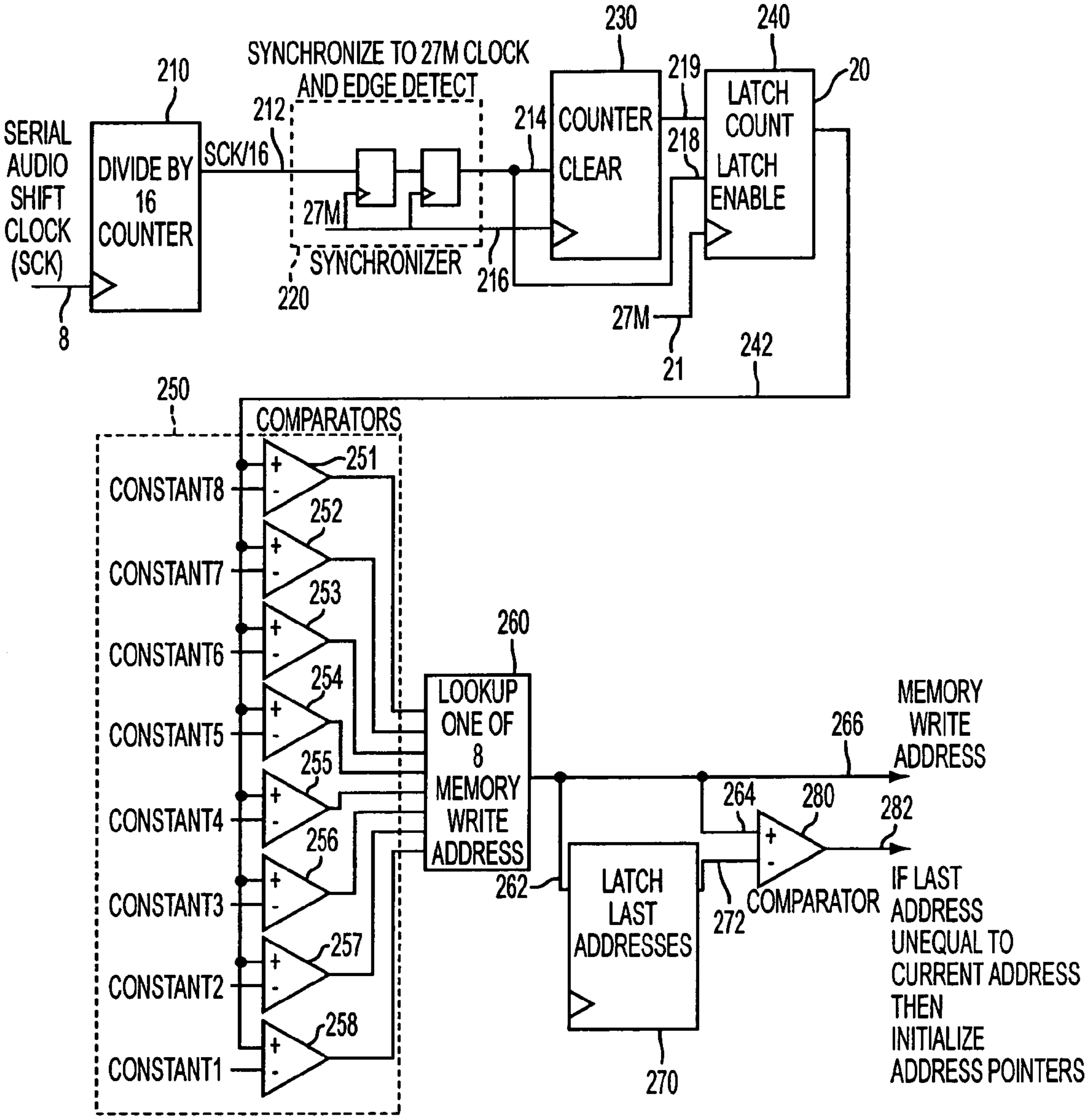
FIG. 5 is a block diagram of the audio format detection circuit.

The format detection process will now be described. The format of the audio signal is detected by the audio format detection circuit 20 shown in FIG. 3. The audio format detection circuit 20 is depicted in more detail in FIG. 5 and its operation is shown in the flow chart of FIG. 6. As shown in FIG. 5, the circuit 20 includes a divide-by-constant-counter 210, which in the preferred embodiment has a constant of 16, clocked by the audio shift clock (SCK) 8, a circuit 220 to synchronize the divide-by-constant signal to a 27 MHz clocking domain, a counter 230 clocked by 27 MHz, a latch 240 to store the previous state of the counter 230, a comparing circuit 250 containing comparators 251 through 258 which compare the stored count to predetermined values, a lookup memory circuit 260, a write address latch 270, and a comparator 280.

Figure 6:
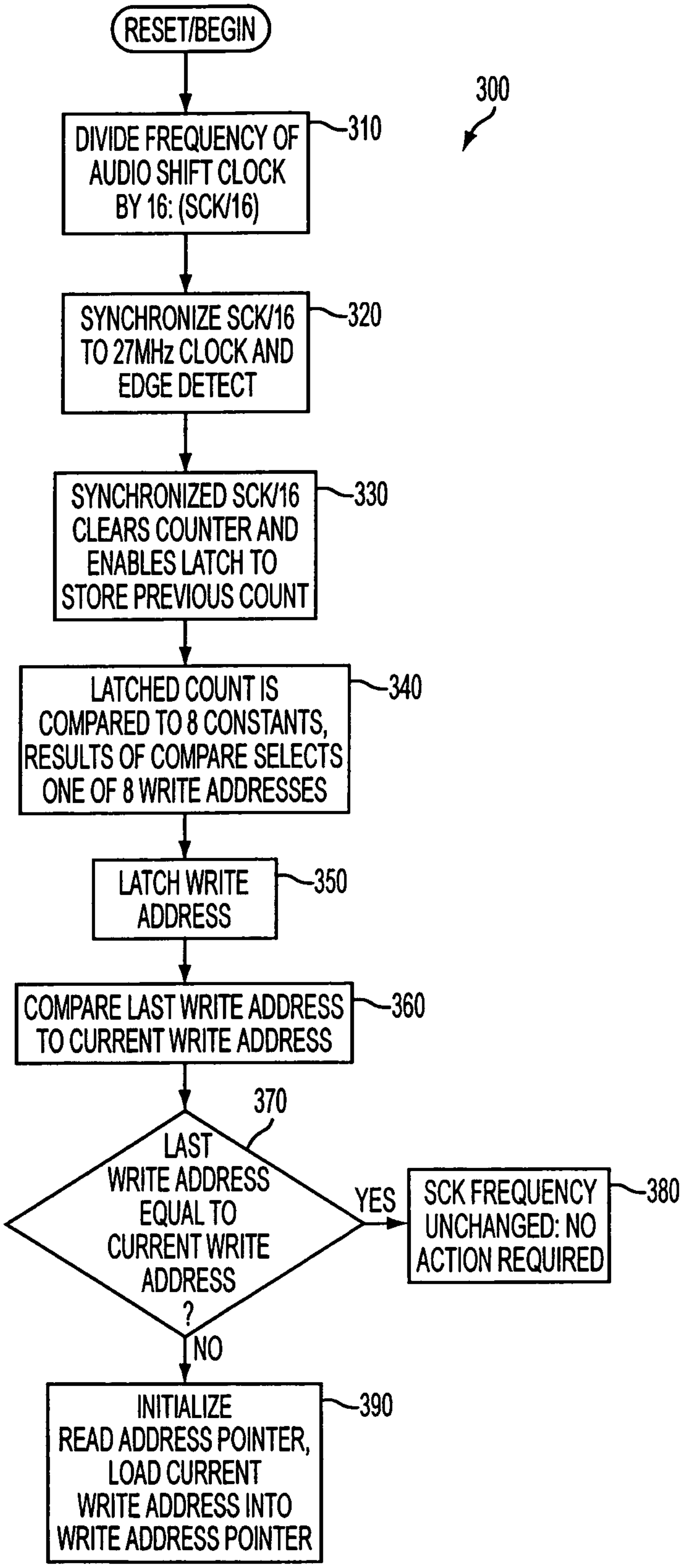
FIG. 6 is a flow chart of the operation of the audio format detection and write address generation circuit.

With the reference of FIG. 6, the format detection circuit flow generally designated 300 generally includes an operation 310 in which the frequency of the audio shift clock is divided by a constant which in the preferred embodiment is equal to 16 to create a SCK/16 signal, an operation 320 in which the SCK/16 and 27 MHz clock are synchronized and edge detection occurs, an operation 330 in which the SCK/16 clears a counter and enables a latch to store the previous count, an operation 340 in which the latched count is compared to constants, the result of the comparison used to select a Write Address, an operation 350 in which a write address is latched, an operation 360 in which the current and last Write Address are compared, an operation 380 in which no action is required if the last and current Write Address are equal, and an operation 390 in which the Read Address Pointer is initialized and the current Write Address is loaded into the Write Address Pointer.

The audio format detection circuit 20 receives the audio clock signal (SCK) through data line 8 and a reference clock signal through data line 21. The SCK input clocks a 4 bit counter 210, which generates a timing signal on data line 212 whose frequency is equal to SCK/16. This signal is sent through a synchronization and edge detection circuit 220, where it is synchronized to the 27 MHz clock domain. The output of the synchronizer 220 is a pulse on data line 214 whose frequency is nominally equal to SCK/16 and whose pulse width is equal to one period of the 27 MHz clock. This pulse becomes a master timing signal. The following events occur once per period of this master timing signal.

The timing pulse clears a counter 230 which is clocked by 27 MHz. The pulse also enables a latch 240 which stores the previous state of the counter 230. The latch 240 now contains a binary number corresponding to the number of cycles of the 27 MHz clock that occurred in the period SCK/16.

Comparators 251 through 258 compare the contents of the latch 240 to eight constant values which correspond to various SCK frequencies. The results of the comparisons are used to select one of eight predetermined Write Address values which is captured in latch 270 such that the Write Address calculated in the previous period is compared to the Write Address calculated in the current period by the comparator 280.

If the Previous and Current Write Address values are equal, then the frequency of the SCK has not changed and no further action is required. However, if the Previous and Current Write Addresses are not equal, then the SCK frequency has changed, and the memory Read and Write Pointers must be initialized. The Read Address pointer is initialized with a constant, and the Write Address pointer is initialized with the Current Write Address calculated as described above. It will be apparent to one skilled in the art that the operations described thus far may be accomplished in a variety of ways, including but not limited to initializing the Write Address pointer with a constant and initializing the Read Address with a constant correlating to the detected format of the audio signal.

The delay for the audio signal is implemented by configuring a memory register (not shown) within the memory controller 30 corresponding to the detected format of the sampled audio clock signal. As described above, each constant value within the comparator circuit 250 referenced above corresponds to an offset value. This offset value is used to configure an address pointer that then configures the memory register. The memory register, configured by the address pointer corresponding to the detected format, forms the delay required by the particular audio format. The memory register is defined with a first parameter and a second parameter. In one embodiment, the memory register is a buffer (not shown), the first parameter is a write address pointer and second parameter is a read address pointer. The write address offset information is provided by the audio format detection circuit 20 through data line 22 to the write address generator circuit 50.

Next, the memory controller 30 configures a write address pointer and a read address pointer. Information for these pointers is provided from the write address generator circuit 50 through data line 52 and the read address generator circuit 60 through data line 62. When the memory controller 30 receives the write address generator information, it resizes the buffer according to the configured write address and the read address pointers. The memory controller 30 then implements the delay corresponding to the resized buffer.

The memory controller 30 sends a control signal on data line 44 to the memory chip 40 to send the stored data signal and frame synchronization signal through the memory data bus 42. The memory controller 30 then reads the signals sent over the data bus 42. If the audio data input FIFO 80 is presently empty, a FIFO empty signal is sent from the FIFO register 80 to the control state machine 70 through data line 82. In response to this signal, the control state machine 70 sends a read request signal through data line 72 to the memory controller 30. Upon receiving this request, the memory controller 30 puts the request in a queue (not shown), completes other memory transactions, and finally sends a signal to the memory chip 40 using data line 44 which causes data to be read from the memory chip 40 and written to the input FIFO 80 under control of the memory controller 30. The input FIFO 80 then performs a parallel to serial conversion and sends its contents to outputs through data lines 84, 86 and 88 under control of the Serial Audio Clock (SCK).

In use, the disclosed circuit 90 provides for a delay in the audio signal corresponding to the particular format of audio signal while minimizing the required hardware. The disclosed embodiment determines the audio sample size and sample rate by comparing the frequency of the serial audio clock to a known reference frequency. It also uses the serial clock to sample the serial audio data signals. It then stores the stream of data in a memory which is configured as a circular buffer having a write pointer and a read pointer. The serial audio clock is then used again to output the serial audio data signals such that a delay in the serial digital audio data stream is achieved.

Having thus described illustrative embodiments of the invention, it will be apparent that various alterations, modifications and improvements will readily occur to those skilled in the art. Such obvious alterations, modifications and improvements, though not expressly described above, are nonetheless intended to be implied and are within the spirit and scope of the invention. Accordingly, the foregoing discussion is intended to be illustrative only, and not limiting; the invention is limited and defined only by the following claims and equivalents thereto.

What is claimed is:

1. An apparatus for delaying an audio signal comprising:

a first FIFO register receptive to a digital audio signal, the digital audio signal having an associated clock signal;

an audio format detection circuit coupled to the first FIFO register and operative to detect a format of the digital audio signal by analyzing the associated clock signal;

a memory controller coupled to the FIFO register;

a memory chip coupled to the memory controller;

a write address generator coupled to the audio format detection circuit and memory controller;

a read address generator coupled to the memory controller; and a second FIFO register coupled to the memory controller and operative to provide a time delay in the digital audio signal the duration of which is related to the detected format of the digital audio signal;

wherein the digital audio signal further comprises a serial audio clock signal and a plurality of accompanying signals;

wherein the audio format detection circuit comprises a synchronization circuit operative to synchronize the serial audio clock and a reference clock and, an edge detection circuit operative to detect edge transitions in the synchronized serial and reference clock.

2. The apparatus as claimed in claim 1, wherein the accompanying signals further comprises a data signal and a frame synchronization signal.

3. The apparatus as claimed in claim 1, wherein the audio format detection circuit is operable to detect a number of edge transitions in the serial audio clock signal and provide a corresponding detected count.

4. The apparatus claimed in claim 1, wherein the audio format detection circuit further comprises a plurality of model data, wherein each model data represents one of a plurality of audio signal formats and a corresponding one of a plurality of time delay data, wherein the detected count is compared to the model data, the audio format detection circuit operable to provide the delay data representing the model data that is equal to the detected count.

5. The apparatus as claimed in claim 4, wherein the processed clock signal is synchronized to a reference clock.

6. The apparatus as claimed in claim 1, wherein the audio format detection circuit is operable to provide a processed clock signal by dividing the serial clock signal by a constant.

7. The apparatus according to claim 6, wherein the processing is operable to compare a new time delay data to an old time delay data, the processing device operable to reconfigure a buffer if the new time delay data is not equal to the old time delay data.

8. The apparatus as claimed in claim 4, wherein the detected count is compared to the model data by a plurality of comparators.

9. The apparatus as claimed in claim 4, wherein the provided time delay data is a first offset value, the processing device operable to resize a write address pointer with the offset value.

10. The apparatus as claimed in claim 4, wherein the provided time delay data is a second offset value, the processing device operable to resize a read address pointer with the offset value.

11. The apparatus as claimed in claim 4, wherein the processing device further comprises a memory unit to provide the time delay corresponding to the time delay data.

12. The apparatus as claimed in claim 9, wherein the processing device further comprises a first parameter and a second parameter, the first parameter configured accordingly to the provided time delay data.

13. The apparatus as claimed in claim 12, wherein the first parameter is a write address parameter, the second parameter is a read address parameter, and the memory unit is a buffer.

14. The apparatus as claimed in claim 1, wherein the audio format detection circuit comprises a memory lookup operative to obtain a memory address according to the detected edge transitions and correlating to the audio format of the digital audio signal, the memory address used to configure the write address generator.

15. The apparatus as claimed in claim 1, wherein the format of the digital audio signal is one of eight possible formats.

16. A method comprising:

receiving a digital audio signal;

analyzing a clock signal associated with the digital audio signal to determine a audio format of the digital audio signal;

providing an audio signal delay according to the audio format of the digital audio signal; and outputting the digital audio signal;

detecting a resulting value from a clock signal synchronized with the digital audio signal and a reference clock;

latching the resulting value;

looking up a memory write address using the resulting value;

comparing the memory write address to a previous memory write address; and if the memory write address is unequal to the previous memory write address, then retrieving a new audio signal delay.

17. A method as recited in claim 16, further comprising counting transitions of a reference clock to create the resulting value.

18. A method as recited in claim 16, further comprising counting transitions of a reference clock during a period of a modified clock signal derived from the clock signal.

19. An apparatus comprising:

means for receiving a digital audio signal;

means for analyzing a clock signal associated with the digital audio signal to determine a audio format of the digital audio signal;

means for implementing audio signal delay by the audio format of the digital audio signal; and means for outputting the digital audio signal;

means for detecting a resulting value from a clock signal synchronized with the digital audio signal and a reference clock;

means for latching the resulting value;

means for looking up a memory write address using the resulting value;

means for comparing the memory write address to a previous memory write address; and means for if the memory write address is unequal to the previous memory write address, then retrieving a new audio signal delay.

* * * * *